United States Patent [19]

Fonsalas et al.

[11] Patent Number: 4,785,348

[45] Date of Patent: Nov. 15, 1988

[54] SYSTEM FOR THE TRANSMISSION AND RECEPTION OF HIGH-DEFINITION TELEVISION PICTURES IN NARROW-BAND CHANNELS

[75] Inventors: Frédéric Fonsalas, Grigny; Jean-Yves Lejard, Paris; Pascal Hayet, Chatenay Malabry; Marcel Le Queau, Ozoir La Ferriere, all of France

[73] Assignee: U.S. Philips Corp., New York, N.Y.

[21] Appl. No.: 116,612

[22] Filed: Nov. 3, 1987

[30] Foreign Application Priority Data

Nov. 7, 1986 [FR] France ................... 86 15530

[51] Int. Cl.[4] ............ H04N 7/12; H04N 7/13
[52] U.S. Cl. .................. 358/133; 358/12; 358/138
[58] Field of Search ........... 358/133, 138, 13, 12

[56] References Cited

U.S. PATENT DOCUMENTS 4,417,269  11/1983  Dischert .................. 358/133
4,716,453  12/1987  Pawelski ................. 358/138

Primary Examiner—Howard W. Britton
Attorney, Agent, or Firm—Thomas A. Briody; Gregory P. Gadson

[57] ABSTRACT

A system for the transmission of high-definition television pictures in narrow-band channels, and a transmitter and a receiver appropriate to the system. The system includes a transmitting section (10) and a receiving section (20). To transmit the picture via a narrow-band channel (30), the picture produced by a camera (35) is subsampled by a circuit (40). One filter out of a plurality of anti-aliasing filters (F1, F2, . . . , Fn) is selected by means of a movement detector (48); the information of this detector is also transmitted to the receiving section (20) to select, in agreement therewith, one filter output of a plurality of filters (I1, I2, . . . , In) to be used for the oversampling operation.

10 Claims, 4 Drawing Sheets a)

b)

c)

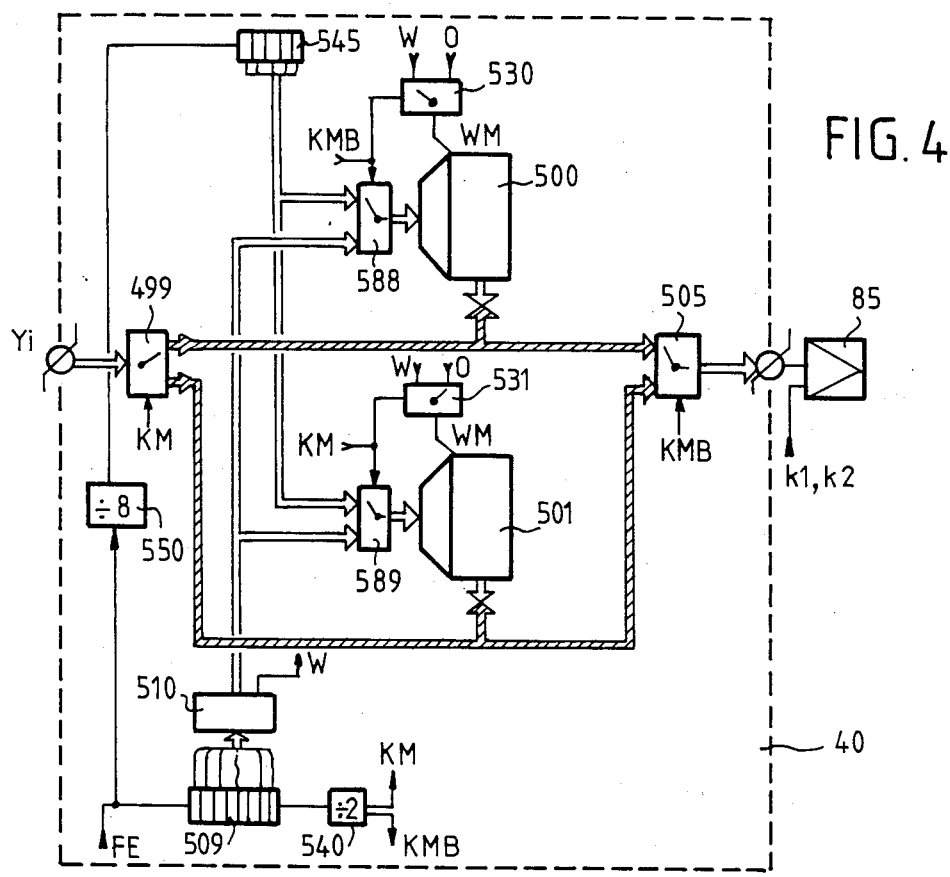

SYSTEM FOR THE TRANSMISSION AND RECEPTION OF HIGH-DEFINITION TELEVISION PICTURES IN NARROW-BAND CHANNELS

BACKGROUND OF THE INVENTION

The present invention relates to a television picture transmission system in which a transmitting section comprises a picture information components producing member, anti-aliasing filters for filtering said picture information components, a picture movement analyser for producing on the basis of the picture information components a quantity representing the movement therein, an output member of the anti-aliasing filters for coupling the input of a sub-sampling circuit to outputs of the anti-aliasing filters, said output member being controlled by the quantity representing the movement, a transmitter circuit for transmitting the information components from the sub-sampling circuit via a transmissiom channel and an information multiplexer for applying to the transmitter circuit in addition to the information from the sub-sampling circuit, output information of a threshold member, in which system a receiving section comprises a receiver circuit for receiving transmitted information components, interpolation filters for oversampling the information received, a receiver member for receiving the quantity representing the movement, an output member of the interpolation filters for supplying the useful information and a demultiplexer circuit for on the one hand applying the samples received to the interpolation filters and on the other hand separating the information originating from the threshold member from the samples received.

The present invention also relates to a transmitter and a receiver appropriate to the system.

Such a system meets important applications in the transmission of high-definition television pictures. The problem met in such a transmission is that one is compelled to use transmission channels having a narrow passband. This passband does not allow a transmission of all the information components of the picture recorded at studio level. It is consequently necessary to sort the information components and to transmit only those information components which render it possible to provide a picture of the best possible quality at the receiver side.

In an article by Yuichi Ninomiya et al., "A single channel HDTV broadcast system-the Muse" published in NHK Laboratories, serial no. 304, September 1984, and in the European patent application No. EP-A 0,146,713 a system of the above-defined type is disclosed which provides a solution for this problem. The anti-aliasing filters are then formed by two filters, one of which acts on the still pictures and the other one on the moving pictures.

The drawback of this known system resides in the fact that there is disparity between the definition of the transmitted pictures when these pictures contain still sense and when the pictures contain moving scenes. Namely, this definition varies from single to double in the two cases, which is particularly visible when the movements are only slight and concern a large portion of the picture.

SUMMARY OF THE INVENTION

The invention has for its object to provide a system of the above-defined type which overcomes this drawback to a large extent.

To that end, a television transmission system of the above-defined type is characterized in that in the transmitting section the number of anti-aliasing filters is at least three and the threshold member also acts on the output member of the anti-aliasing filters, and in the receiving section the number of interpolation filters is at least three and the de-multiplexer circuit applies the threshold member output information of the transmitting section to a control input of the output member of the interpolation filters, whilst the filter output members of the transmitting and receiving sections are change-over switches.

BRIEF DESCRIPTION OF THE DRAWINGS

The following description which is given as a non-limitative example with reference to the accompanying drawings will make it better understood how the invention can be put into effect.

FIG. 4 shows a sub-sampling circuit in accordance with a preferred embodiment.

FIG. 5 has for its purpose to explain the sub-sampling operation.

DETAILED DESCRIPTION OF THE INVENTION

Figure 1:
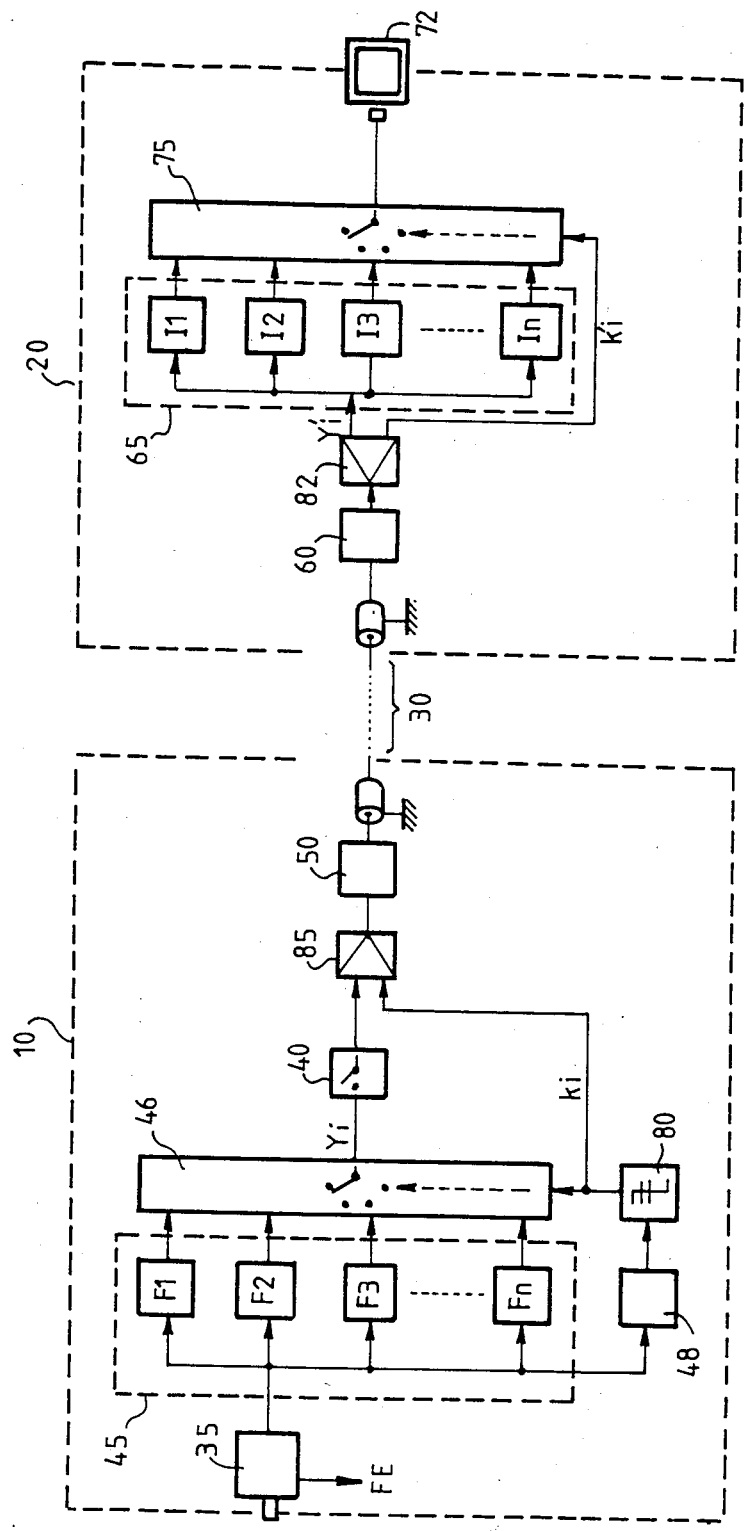
FIG. 1 shows the picture transmission system according to the invention.

The system according to the invention shown in FIG. 1 is assembled from two sections: a transmitting section 10 and a receiving section 20. These two sections are interconnected by a transmission channel 30. The pictures to be transmitted are recorded by a high-definition television camera 35 which analyzes a scene by a 1250 line scanning operation at a rate of 50 pictures per second. The camera supplies three signals: a luminance signal Y and color difference signals U and V. To simplify the description only the luminance signal Y will be described, on the understanding that the processing operations described in greater detail hereinafter also apply to the U and V signals. The output signal Y of this camera 35 is thereafter sampled. The samples are then produced at a rate of 108 MHz. As the transmission only allows a rate of 13.5 MHz it is necessary to effect a sub-sampling operation with the aid of a sub-sampler 40, that is to say that only some of all the samples originating from the camera 35 will be transmitted. Before subjecting the samples to this processing operation, the samples produced by the camera 35 must be submitted to the anti-aliasing filtering operation which is effected by means of a filter bank 45. The output signals of the filter bank 45 can be transmitted to the sub-sampler 40 via an output member 46 of the filter bank 45. This output member 46 is controlled by a control quantity provided by a movement analyzer 48. After the sub-sampling operation the samples are further processed by a transmitting circuit 50 to adapt them to the transmission channel 30.

The samples are thereafter received by the receiving section 20; they are recovered to their initial form by a receiver circuit 60. These recovered samples must be submitted to an oversampling operation by means of a bank of interpolation filters 65. It should be noted that the oversampling operation consists in producing, by interpolation, additional samples from the transmitted samples. These sub-sampling and oversampling operations are described in chapter X of the publication "Traitement numérique du signal"—by M. Bellanger, published in Editions MASSON, France 1984. The useful information components supplied by this filter bank are applied to a user member 72 via an output member 75.

In accordance with the invention, there are provided in the transmitting section 10 a filter bank 45 comprising "n" anti-aliasing filters F1, F2, F3, ... Fn, a threshold member 80 for supplying an information $k_i$ and thus to act on the output member 46 in response to output information from the movement analyser 48, and an information multiplexer 85 for applying output information of the threshold circuit 80 to the transmitter circuit 50 in addition to the output samples of the sub-sampling circuit 40. The receiving section 20 includes a bank 65 of interpolation filters I1, I2, I3 ... , In, which correspond to the filters F1, F2, F3, ..., Fn, a demultiplexer circuit 82 for applying on the one hand the received samples $Y'_i$ to the filter bank 65 and on the other hand the information $k'_i$ coming from the threshold member to a control input of the output member 75.

Figure 2:
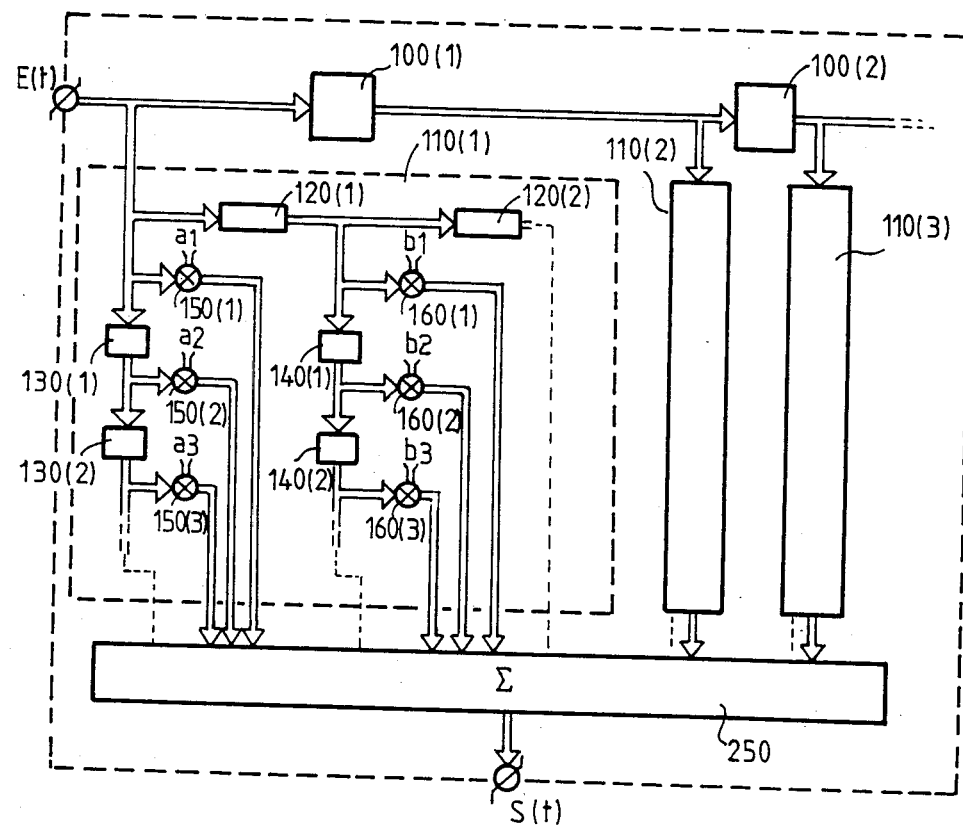
FIG. 2 shows the general structure of the filters used by the invention.

The structure of the anti-aliasing filters F1, F2, ..., Fn and the interpolation filters I1, I2, ..., In is shown in general outline in FIG. 2. The structures are those of linear digital filters.

This filter structure comprises first of all a sequence of field memories 100(1), 100(2), ..., each providing a delay equal to the duration of a field, the input of the memory 100(1) receives the digital signal E(t) to be processed. Sub-filtering members 110(1), 110(2), 110(3), ..., are associated with these memories. The input of the member 110(1) is connected to the input of the memory 100(1), the input of the member 110(2) is connected to the output of the memory 100(1), and the input of the member 110(3) to the output of the memory 100(2). Only the structure of the member 110(1) is shown in detail. This member is comprised of a sequence of line memories 120(1), 120(2), ..., each producing a time delay equal to a line period. Then there are provided at the input of the memory 120(1) a first sequence of picture element memories (130(1), 130(2), ..., each producing a delay equal to the duration of a picture element; a second sequence of picture elements 140(1), 140(2) which is connected to the output of the memory 120(1), ... etc., which continues for all the line memories present. Multipliers 150(1), 150(2), 150(3), ... are associated with memories 130(1) and 130(2) for multiplying the input signal of the memory 130(1), the output signal of this memory 130(1) and the output signal of the memory 130(2) ... by respective filter coefficients a1, a2, a3, ... In a similar manner, multipliers 160(1), 160(2), 160(3), ... multiply the input signal of the memory 140(1), the output signal of this same memory and the output signal of the subsequent memory 140(2), ... by respective filter coefficients b1, b2 and b3, ... An adder member 250 supplies the output signal S(t) by taking the sum of all the signals obtained from the multipliers of all the sub-filtering members 110(1), 110(2), 110(3).

Now, always by way of non-limitative example, a preferred embodiment of the invention will be described in greater detail with reference to the parameters mentioned in the foregoing.

In accordance with this embodiment, the bank of anti-aliasing filters 46 is formed by three filters F1, F2 and F3 and, in agreement therewith, the interpolation filter bank is formed by three filters I1, I2 and I3.

Figure 3:
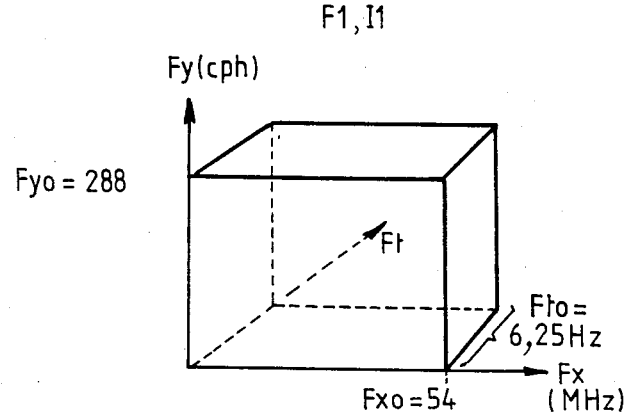
FIG. 3 shows the transfer characteristics of the filters used in a preferred embodiment of the invention.
Figure 3:
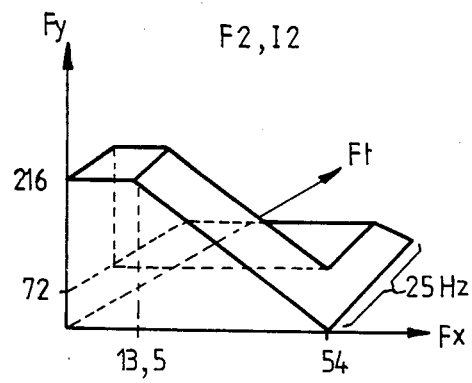
Figure 3:
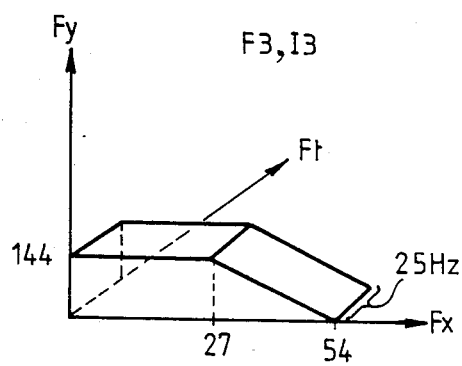

The frequency characteristics of these filters are shown in FIG. 3 in the three-dimensional representation, along three axes Fx, Fy and Ft.

The axis Fx represents the horizontal definition of the picture and is expressed in frequency (MHz).

The axis Fy represents the vertical definition of the picture and is expressed in cycles per height (Cph)

The axis Ft represents the time and is measured in Hz.

The filters F1 and I1 are shown at a in FIG. 3. The frequency transfer characteristics of these filters have the shape of a rectangular parallelepiped; in the preferred embodiment this parallelepiped is characterized by $Fx_o = 54$ MHz
$Fy_o = 288$ Cph
$t_o = 6.25$ Hz The filters F2 and I2 shown at b in FIG. 3 have a plateau in the plane Fy, Fx between 0 and 13.5 MHz then a descending region up to 54 MHz and, in the plane Fy, Ft they are shown having a step from 0 to 6.25 Hz of the nominal amplitude of 216 cph, thereafter a further step having an amplitude of 72 cph.

The filters F3, I3 shown at c in FIG. 3 have a plateau in the plane Fy, Fx of an amplitude 144 extending from 0 to 27 Mhz and thereafter a descending slope to 54 MHz.

The movement analyser 48, which determines which filter of the filters F1, F2 and F3 is to be used, is, for example, of a type described in the article "A motion vector detector for MUSE encoder" by Yuichi Ninomiya, published in IEEE 1986 INTERNATIONAL CONFERENCE ON COMMUNICATIONS, 1986 TORONTO (Canada) 22 to 25 June 1986, vol. 2, pages 1280-1284.

Thus, a shift value is assigned to blocks of picture elements. The threshold member 80 provides for two binary elements k1 and k2 the indication of this movement:

when the movement is substantially zero, the filter F1 is chosen,
when the movement is only slight, the filter F2 is selected,
when the movement is very pronounced, the filter F3 is selected.

These binary elements k1 and k2 are transmitted via the transmission channel 30 to the transmitter circuit 50. For this purpose an information multiplexer 85 is provided which has for its object to insert these binary elements.

FIG. 4 is a detailed illustration of the sub-sampling member 40.

The luminance samples $Y_i$ appear at the input of a demultiplexer 499 with the object of being stored in one of the two memories 500 and 501. This storage is effected alternately in these two memories in a manner such that, when one memory is written, the other memory is read. A multiplexer 505 renders it possible to apply the information components from one of the two memories 500 and 501 to the input of the transmitter circuit 50 via the multiplexer 85. The position of the demultiplexer 499 and the multiplexer 505 is fixed by the complementary signals KM and KMB, respectively, thus indicating that, when the information components $Y_i$ are present at the data input of the memory 500, the data input of the memory 501 is coupled to the input of the transmitter circuit 50 and that when the data input of the memory 500 is coupled to the input of the transmitter circuit 50, the information components $Y_i$ are present at the data input of the memory 501.

The write addressing operation of the memories 500 and 501 is effected by means of a counter 509 to which a transcoding circuit 510 is associated, for the purpose of effecting a selected addressing in the memories 500 and 501 in accordance with criteria which will be discussed hereinafter. The counter 509 is incremented at a sampling rate determined by a signal FE supplied by, for example, the member 35. In addition to the write address for the memories 500 and 501, a signal W is derived to enable writing of these memories; this signal W is applied to the write control input WM of the memories 500 and 501 via the two-position multiplexers 530 and 531 which are controlled by the respective signals KMB and KM. The signals KM and KMB are provided by a flip-flop 540 arranged subsequent to the counter 509; if the capacity of the counter corresponds to the number of samples or picture elements of a high-definition picture, the signals KM and KMB change their values at each new picture.

The read addressing operation of the memories 500 and 501 is effected directly by means of a counter 545 which is incremented at the rate of the signals supplied by a frequency divider 550 which devides the signal FE by eight.

To apply the read or write code, two multiplexers 588 and 589 are used which are connected to the memories 500 and 501 respectively.

It is easy for a person skilled in the art to provide a transcoding circuit 410 by programming a read-only memory on the basis of the following considerations:

First of all it should be noted that the digital picture presents itself as a two-dimensional table formed by points and lines. Use is made of FIG. 5 which shows a portion of this table to explain the manner in which the sub-sampling operation is effected.

Each point of this table is referred on the one hand by a horizontal location code H1, H2, H3, H4, H5, H6, . . ., and, on the other hand by a vertical location code V1, V2, V3, . . . , V7, . . .

The samples $Y_i$ arrive in the normal sequence, picture element-sequentially and line-sequentially, that is to say they can be represented: by (H1, V1); (H2, V1); (H3, V1); . . . until the end of the line V1, thereafter by (H1, V2); (H2, V2); (H3, V2); . . . until the end of the line V2 and so forth for each line.

By means of the transcoding circuit the points referenced A in FIG. 5 are stored first, that is to say the points corresponding to (H1, V1); (H3, V1); (H5, V1); . . . ; (H2, V5); (H4, V5); thereafter the points B: (H2, V3); (H4, V3); . . . ; (H1, V7); (H3, V7); thereafter the points C: (H2, V1); (H4, V1); . . . ; (H1, V5); (H3, V5); and, finally, the points D: (H1, V3); (H3, V3); (H5, V3); . . . ; (H2, V7) . . . It should be noted that in this procedure all the points situated on the even lines V2, V4, . . ., are ignored.

We claim:

1. A television picture transmission system in whIch a transmitting section comprises a picture information components producing member, anti-aliasing filters for filtering said picture information components, a picture movement analyser for producing on the basis of the picture information components a quantity representing the movement therein, an output member of the anti-aliasing filters for coupling the input of a sub-sampling circuit to outputs of the anti-aliasing filters, said output member being controlled by the quantity representing the movement, a transmitter circuit for transmitting the information components from the sub-sampling via a transmission channel and an information multiplexer for applying to the transmitter circuit, in addition to the information from the sub-sampling circuit, output information of a threshold member, in which system a receiving section comprises a receiver circuit for receiving transmitted information components, interpolation filters for oversampling the information received, a receiver member for receiving the quantity representing the movement, an output member of the information filters for supplying the useful information and a demultiplexer circuit for on the one hand applying the samples received to the interpolation filter and on the other hand separating the information originating from the threshold member from the samples received, characterized in that in the transmitting section the number of anti-aliasing filters is at least three and the threshold member also acts on the output member of the anti-aliasing filters, and in the receiving section the number of interpolation filters is at least three and the demultiplexer circuit applies the threshold member output information of the transmitting section to a control input of the output member of the interpolation filters, whilst the filter output members of the transmitting and receiving sections are change-over switches.

2. A television picture transmission system as claimed in claim 1, characterized in that the number of anti-aliasing filters in the transmitting section and the number of interpolation filters in the receiving section are identical.

3. A television picture transmission system as claimed in claim 2, characterized in that said number of filters is equal to 3.

4. A television picture transmission system as claimed in claim 1, characterized in that said filters are linear digital filters.

5. A television picture transmission system as claimed in claim 4, characterized in that the number of anti-aliasing filters in the transmitting section and the number of interpolation filters in the receiving section are identical.

6. A television picture transmission system as claimed in claim 5, characterized in that said number of filters is equal to 3.

7. A television picture transmission system as claimed in claim 1, characterized in that the movement information relates to a block of picture elements.

8. A television picture transmission system as claimed in claim 7, characterized in that said filters are linear digital filters.

9. A television picture transmission system as claimed in claim 7, characterized in that the number of anti-aliasing filters in the transmitting section and the number of interpolation filters in the receiving section are identical.

10. A television picture transmission system as claimed in claim 9, characterized in that said number of filters is equal to 3.

* * * * *